US006366558B1

(12) United States Patent
Howes et al.

(10) Patent No.: US 6,366,558 B1
(45) Date of Patent: Apr. 2, 2002

(54) METHOD AND APPARATUS FOR MAINTAINING CONNECTION STATE BETWEEN A CONNECTION MANAGER AND A FAILOVER DEVICE

(75) Inventors: Richard A. Howes, Roswell; Edward C. Kersey; Bruce F. Wong, both of Athens; James A. Jordan, Lawrenceville; William M. Leblanc, Athens, all of GA (US); Andrew L. Foss, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/107,261

(22) Filed: Jun. 30, 1998

Related U.S. Application Data

(63) Continuation-in-part of application No. 08/918,024, filed on Aug. 25, 1997, now Pat. No. 6,108,300, and a continuation-in-part of application No. 08/920,211, filed on Aug. 25, 1997, now Pat. No. 5,989,060, and a continuation-in-part of application No. 08/850,248, filed on May 2, 1997, now abandoned, and a continuation-in-part of application No. 08/850,730, filed on May 2, 1997, now Pat. No. 6,061,349, and a continuation-in-part of application No. 08/850,836, filed on May 2, 1997, now abandoned.

(51) Int. Cl.$^7$ .............................................. G01R 31/08
(52) U.S. Cl. ....................... 370/219; 370/218; 370/254; 370/392
(58) Field of Search ................................ 370/252, 254, 370/410, 475, 219, 220, 389, 392, 401, 402, 403, 404, 397, 399, 400; 709/100, 104, 105, 106, 201, 219, 220, 221, 223, 224, 227, 229, 231; 713/100

(56) References Cited

U.S. PATENT DOCUMENTS

| | | | | |
|---|---|---|---|---|
| 5,546,452 A | * | 8/1996 | Andrews et al. | 379/219 |
| 5,668,986 A | * | 9/1997 | Nilsen et al. | 707/10 |
| 5,774,660 A | * | 6/1998 | Brendel et al. | 709/201 |
| 5,809,265 A | * | 9/1998 | Blair et al. | 345/339 |
| 5,819,020 A | * | 10/1998 | Beeler, Jr. | 714/5 |
| 5,917,997 A | * | 6/1999 | Bell et al. | 714/4 |
| 5,918,017 A | * | 6/1999 | Attanasio et al. | 709/224 |

* cited by examiner

Primary Examiner—Melvin Marcelo
Assistant Examiner—Inder Pal Mehra
(74) Attorney, Agent, or Firm—Van Pelt & Yi LLP

(57) ABSTRACT

A system and method are disclosed for maintaining the state of a virtual connection supported by an active connection manager on a standby connection manager. The method includes configuring the standby connection manager to include a physical machine object that stores a physical IP address of a physical machine that is available to the active connection manager and a virtual machine object that stores a virtual IP address of a virtual machine that is implemented on the connection manager. A replication packet is received at the standby connection manager from the active connection manager wherein the replication packet includes a foreign IP address, the virtual IP address and the physical IP address. A standby connection object is stored in the connection manager. The standby connection object includes the foreign IP address, the virtual IP address and the physical IP address from the replication packet on the standby connection manager.

6 Claims, 11 Drawing Sheets

METHOD AND APPARATUS FOR MAINTAINING CONNECTION STATE BETWEEN A CONNECTION MANAGER AND A FAILOVER DEVICE

CROSS REFERENCE TO RELATED APPLICATIONS

This application is a continuation in part of U.S. patent application Ser. No. 08/850,248 filed May 2, 1997 now abandoned, SYSTEM FOR DISTRIBUTING LOAD OVER MULTIPLE SERVERS AT AN INTERNET SITE, by Brantley W. Coile, et al. and U.S. patent application Ser. No. 08/850,730 filed May 2, 1997, now U.S. Pat. No. 6,061,349, SYSTEM AND METHOD FOR IMPLEMENTING MULTIPLE IP ADDRESSES ON MULTIPLE PORTS, by Brantley W. Coile, et al. and U.S. patent application Ser. No. 08/850,836 filed May 2, 1997 now abandoned, SYSTEM AND METHOD FOR PROVIDING BACKUP MACHINES FOR IMPLEMENTING MULTIPLE IP ADDRESSES ON MULTIPLE PORTS, by Brantley W. Coile, et al. and U.S. patent application Ser. No. 08/918,024 filed Aug. 25, 1997, now U.S. Pat. No. 6,108,300, METHOD AND APPARATUS FOR TRANSPARENTLY PROVIDING A FAILOVER NETWORK DEVICE, by Brantley W. Coile, et al. and U.S. patent application Ser. No. 08/920,211 filed Aug. 25, 1997, now U.S. Pat. No. 5,989,060, SYSTEM AND METHOD FOR DIRECT COMMUNICATION WITH A BACKUP NETWORK DEVICE VIA A FAILOVER CABLE, by Brantley W. Coile, et al. which are incorporated herein by reference for all purposes.

This application is related to U.S. patent application Ser. No. 09/107,244 filed Jun. 30, 1998, LOAD BALANCING BASED ON CLIENT IP ADDRESS, by Richard A. Howes, et al. and U.S. Pat. application Ser. No. 09/107,261 filed on Jun. 30, 1998 filed concurrently herewith, which is incorporated herein by reference for all purposes.

BACKGROUND OF THE INVENTION

1. Field of the Invention

The present invention relates generally to a virtual connection manager that maintains virtual connections from outside machines to a local machine or group of machines. Specifically, the invention relates to a method for keeping track of the state of the virtual connections at a failover connection manager so that, if the active connection manager fails, the failover connection manager can become active and handle the connections without requiring the outside machines to break their connections and reestablish new connections.

2. Description of the Related Art

A Local Director connection manager that manages connections from remote clients to a local group of web servers is described in U.S. patent applications Ser. No. 08/850,248 (Attorney Docket No. CISCP005); Ser. No. 08/850,730 (Attorney Docket No. CISCP007); Ser. No. 08/850,836 (Attorney Docket No. CISCP008); Ser. No. 08/918,024 (Attorney Docket No. CISCP011); Ser. No. 08/920,211 (Attorney Docket No. CISCP013) which were previously incorporated by reference for all purposes.

The Local Director manages requests from remote clients to IP addresses corresponding to virtual machines implemented on the Local Director by translating the destination IP address and port number of incoming packets to the destination IP address and port number of a real machine that the Local Director has at its disposal to handle connections for the virtual machines that the Local Director is implementing. Likewise, the Local Director simulates responses from the virtual machines to the remote clients by translating the source IP address and port number of the real machines that the Local Director has at its disposal to the source IP address and port numbers of the virtual machines that the Local Director is implementing. Thus, the outside clients establish a connection that appears to be a connection to a virtual machine corresponding to destination IP address and destination port number selected by the client. The Local Director translates IP addresses and port numbers of inbound and outbound packets so that packets from the client are directed to a real machine that is selected by the Local Director to handle the virtual connection and packets from the real machine appear to the client to have originated from the virtual machine.

It should be noted that the terms client and server are used to refer to remote machines and local machines, respectively. In certain systems, the client and server designations may actually be reversed and it should be remembered that the following description could equally apply to local virtual clients and remote servers. Furthermore, although the invention will be specifically described as relating to the Local Director it should be appreciated that the method and apparatus described herein would be applicable to other connection managers that maintain information about the state of various virtual connections. Therefore, the terms Local Director and connection manager are used interchangeably throughout this specification.

Because the Local Director often functions as a single connection point or gateway to a group of servers that function as web servers that implement a large number of virtual servers having virtual IP addresses, the Local Director is potentially a single point of failure that could completely knock out all of the websites corresponding to virtual IP addresses served by the Local Director. Since this is undesirable, it is important that a standby or backup Local director be provided to handle connections when the primary or active Local Director fails. A method for detecting failure of a Local Director and activating a backup Local Director to handle connections is described in U.S. patent application Ser. No. 08/918,024, (Attorney Docket No. CISCP011) which was previously incorporated by reference. Two IP addresses, an active IP address and a failover IP address, are provided. When failure of the active Local Director is detected by a standby Local Director, then the standby Local Director assumes the active IP address and begins handling connections.

When the standby Local Director becomes active, it does not have all of the information about the connections that were being maintained by the failed Local Director. Therefore, packets corresponding to those connections cannot be handled by the newly active Local Director. The packets are dropped or error messages are sent to the packet senders. The connections handled by the failed Local Director then are torn down and new connections are established through the standby Local Director. Tearing down all of the connections handled by the failed Local Director and establishing new connections through the standby Local Director causes delay for the clients and introduces a significant amount of overhead on the newly activated standby Local Director while all of the former connections are being reestablished. Furthermore, each of the connections must be torn down by whichever physical machine (also referred to as a real machine) was selected to handle the connection by the failed Local Director at the same time as the new connections that are replacing the old connections are being established.

It would be useful if a method could be devised to have the standby Local Director replace the failed Local Director and also obtain the state of all the connections handled by the failed Local Director so that the connections would not need to be dropped and reestablished. What is needed, therefore, is a way of tracking the state of the connections made through an active Local Director at a standby Local Director and a method of causing the standby Local Director to activate and handle the connections when the primarily Local Director fails. Ideally, such a method should require a minimum amount of processing by the active Local Director and should take advantage of the unused processing power of the standby Local Director which itself does not need to handle connections while it is in stand by mode.

SUMMARY OF THE INVENTION

Accordingly, the present invention provides a method and apparatus for maintaining connection state between a connection manager and a failover connection manager. When connections are established or torn down, a replication packet is sent from an active connection manager to a failover connection manager. The replication packet includes information about the connection and the failover connection manager stores that information. When the failover connection manager determines that the active connection manager has failed, the failover connection manager becomes active. Since the failover connection manager already has the information necessary to support all of the connections formerly handled by the failed connection manager, it is possible the failover connection manager can immediately begin to handle the connections without requiring each connection to be dropped and then reestablished.

It should be appreciated that the present invention can be implemented in numerous ways, including as a process, an apparatus, a system, a device, a method, or a computer readable medium. Several inventive embodiments of the present invention are described below.

In one embodiment, a system and method are disclosed for maintaining the state of a virtual connection supported by an active connection manager on a standby connection manager. The method includes configuring the standby connection manager to include a physical machine object that stores a physical IP address of a physical machine that is available to the active connection manager and a virtual machine object that stores a virtual IP address of a virtual machine that is implemented on the connection manager. A replication packet is received at the standby connection manager from the active connection manager wherein the replication packet includes a foreign IP address, the virtual IP address and the physical IP address. A standby connection object is stored in the connection manager. The standby connection object includes the foreign IP address, the virtual IP address and the physical IP address from the replication packet on the standby connection manager.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

Reference will now be made in detail to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
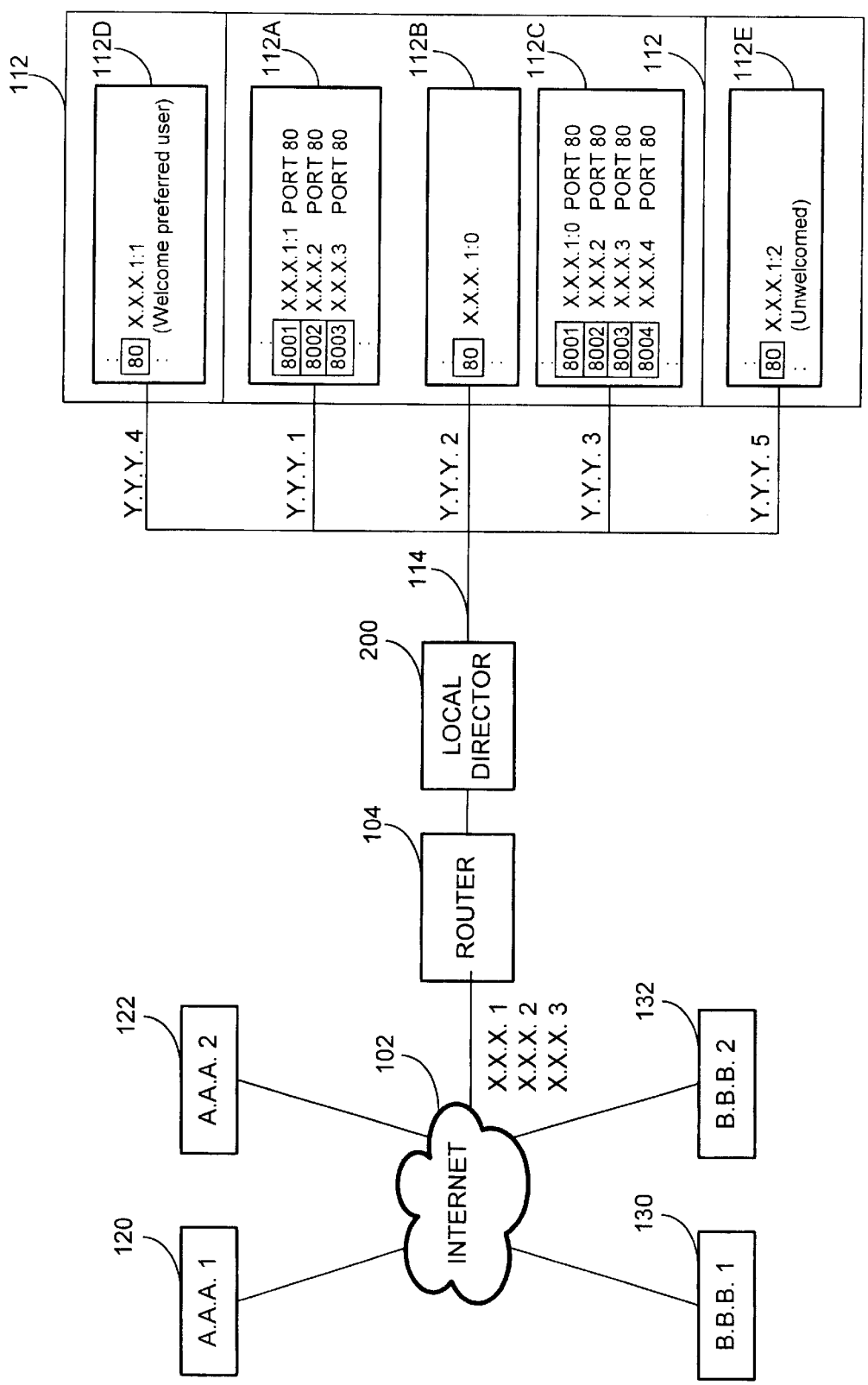
FIG. 1 is a block diagram illustrating a Local Director that distributes outside connections to a group of physical machines that implement several web sites.

FIG. 1 is a block diagram illustrating a Local Director® that distributes outside connections to a group of physical machines 112 (also referred to as real machines) that implement several web sites. Several Clients are shown which may connect to the websites that are implemented. A Client 120 has an IP address A.A.A.1 and a Client 122 belongs to the same subnet and has an IP address A.A.A.2. Also, a Client 130 has an IP address B.B.B.1 and a Client 132 that belongs to the same subnet has an IP address B.B.B.2. Clients make connections to virtual machines that have virtual IP addresses that are known to the Client. Each port of each virtual machine is bound to one or more real ports on a real machine. When a new connection is requested for a virtual machine port, then one of the real machine ports that is bound to the virtual machine port is selected to handle the connection. The selection is made using a load balancing scheme or other distribution scheme that distributes connections among all of the real ports that are bound to the virtual machine port specified in the incoming SYN packet.

Thus, the Local Director uses a group of physical to implement virtual machines that appear to the outside world to be handling connections. In addition, special instances of virtual machines having the same IP address may be defined that handle connections from certain source IP addresses and are bound to certain physical machines designated to handle those connections. Physical machine 112B is bound to a special instance of the virtual machine that corresponds to IP address X.X.X.1. The special instance of X.X.X.1 has a Bind ID of 0 and is denoted X.X.X.1:0. Similarly, physical machine 112D is bound to a special instance of the virtual machine with IP address X.X.X.1 that has a Bind ID of 1. This is denoted X.X.X.1:1. Also, physical machine 112E is bound to an instance of the virtual machine with a Bind ID of 2, denoted by X.X.X.1:2. Physical machine 112A has a port which is bound to X.X.X.1:1 and physical machine 112C has a port which is bound to X.X.X.1:0. The physical machines may also have other ports which are bound to other virtual IP addresses, as is shown.

Although the users at A.A.A.1, A.A.A.2, B.B.B.1, and B.B.B.2 each connect to a single virtual IP address, X.X.X.1, the different users at different source IP addresses are sent to different physical machines when they request a connection. That is because the different instances of the virtual machine have different Bind ID's and each Bind ID may service a different outside Client that has a different IP address.

In the example shown, X.X.X.1:1 is an instance of the virtual machine X.X.X.1 that is made available to preferred users. The physical machines assigned to the virtual machine may be faster, may have fewer Clients assigned to them so they tend to be less backlogged, or may simply have special processes running on them for preferred users. The physical machines are bound to the instance of the virtual machine object X.X.X.1 that is bound to Bind ID 1. Physical machine 112D includes a number of ports which are bound to various ports that may be specified in a SYN packet. Physical machine 112D handles connections for packets that include a destination IP address X.X.X.1 and a source IP address that corresponds to an IP address that is assigned to Bind ID 1. Physical machine 112A includes a port 8001 that receives connections with a destination port 80 and a destination address X.X.X.1 that come from a Client that is bound to Bind ID 1. Port 8001 may run a special process for preferred users connecting to port 80.

Similarly, physical machines 112B and 112C include ports which are bound to the instance of the virtual machine that corresponds to X.X.X.1 and Bind ID 0. Bind ID 0 is, in one embodiment, a special Bind ID that corresponds to any source IP address that is not assigned to any other Bind ID. Thus, Bind ID 0 could be assigned to the general public. A physical machine 112E has an IP address Y.Y.Y.5 and includes ports that are bound to an instance of a virtual machine object with IP address X.X.X.1 and Bind ID equal to 2. Bind ID 2 corresponds to Clients or users who for some reason are not welcome at the website. Thus, SYN packets with a source IP address that corresponds to such a Client are handled by virtual machine X.X.X.1 with a Bind ID 2 and are directed to physical machine 112E. Physical machine 112E runs special processes on its ports that either drop the connection or notify the user that the connection is unwelcome.

Thus, user 120 with IP address A.A.A.1 may be assigned to the instance of virtual machine X.X.X.1 with a Bind ID of 1 so that user 120 is treated as a preferred user and has access to certain physical machines such as 112D and 112A that are bound to X.X.X.1:1. Other users such as user 130 at IP address B.B.B.1 may be unwelcome users and may have their connection requests handled by a physical machine such as physical machine 112E which runs special process and is bound to the instance of virtual machine X.X.X.1 with a Bind ID of 2. Other users which are not specified and are not assigned to a specific Bind ID are serviced by physical machines 112B and 112C which are bound to the instance of virtual machine X.X.X.1 with a Bind ID of 0. The status of any particular user may be changed by simply assigning the IP address of the user to a different instance of virtual machine X.X.X.1.

Thus, all users ask for the same IP address, X.X.X.1, but they are treated differently based on the source IP address in the SYN packet that is sent to request a connection. The connection is assigned to a virtual machine with a Bind ID that corresponds to the initiator of the connection. A preferred user such as the user at IP address A.A.A.1 does not need to send packets to a special IP address in order to receive special treatment. The user need only connect to a standard IP address that may be published to all users including preferred users, general users, and even undesirable users. The preferred user's connection will be assigned to a special instance of a virtual machine that is bound to physical machines that run special processes for preferred users or provide superior response for preferred users. An undesired user such as the user at B.B.B.1, may know the same IP address that a preferred user knows, but when user B.B.B.1 attempts to connect to that address, the Local Director will assign the undesired user's connection to a different instance of virtual machine X.X.X.1 that is bound to a physical machine that runs a process for unwelcome users. Other users that are neither preferred or undesired have their connection assigned to an instance of a virtual machine that is bound to physical machines that service connections from such unclassified users.

It should be noted that in some embodiments, the instances of virtual machines that are assigned to preferred users may also be bound to physical machines which serve unclassified users as well. When this occurs, preferred users will have access to physical machines serving unclassified users when the physical machines serving preferred users are busy. In other embodiments, preferred users are only sent to physical machines that serve unclassified users when one or all of the physical machines serving preferred users has failed. Thus, the Local Director assigns incoming connections from a preferred user to a special instance of a virtual machine. The virtual machine may then either direct the connection to a special physical machine that services only the preferred user or to a general machine that services unclassified users when the special physical machine is busy or failed.

Figure 2:
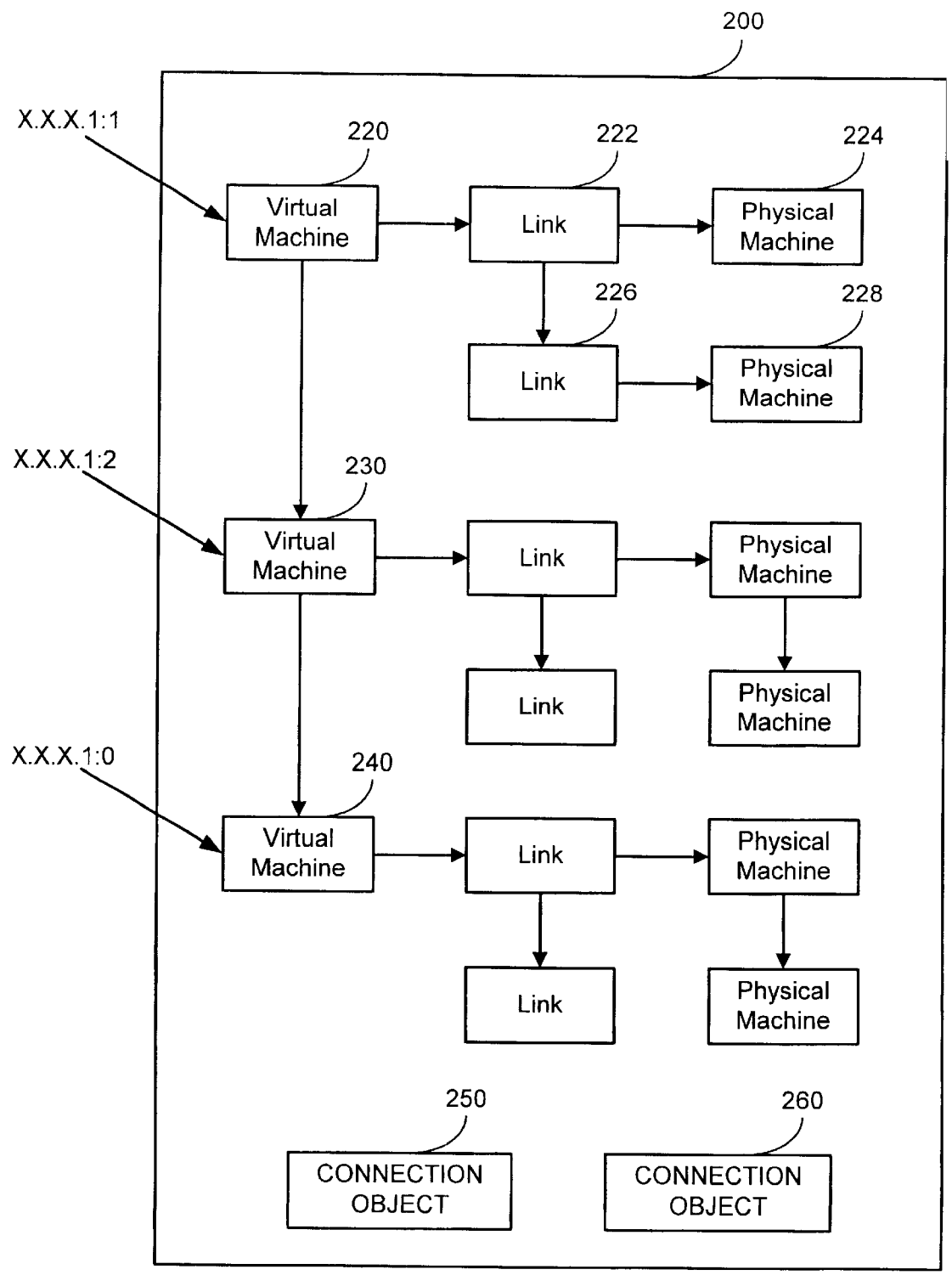
FIG. 2 is a block diagram illustrating an arrangement of data structures within a Local Director.

FIG. 2 is a block diagram illustrating an arrangement of data structures within a Local Director 200 that keeps track of the virtual machines implemented on Local Director 200 and the physical machines available to implement those virtual machines. The data structures are described in further detail in FIG. 3A through FIG. 3C. A first virtual machine object 220 stores information about a first virtual machine. Virtual machine object 220 includes an IP address for a virtual machine, a port number for the virtual machine, and a Bind ID, the purpose of which will be described below.

Virtual machine object 220 also points to a Link object 222 that points to a physical machine object 224. Link object 222 also points to another link object 226 that points to a physical machine object 228. Together, the virtual machine objects form a linked list that facilitates searching for the virtual machine which corresponds to a new connection request. Likewise, the link objects form a linked list that facilitates searching for a physical machine that is bound to a virtual machine to handle a new connection to the virtual machine. A connection object 250 and a connection object 260 contain pointers to the virtual machines and physical machines that correspond to the connections that they represent.

Each virtual machine object includes a Bind ID. Each of the virtual machine objects may have the same virtual IP address, but the virtual machine objects are distinguished by their Bind ID's and port numbers, if a port number is specified. In the example shown, the first instance of the virtual machine with IP address X.X.X.1 is represented by virtual machine object 220 with Bind ID 1. Virtual machine object 220 stores the Bind ID 1 which distinguishes virtual machine object 220 from the other virtual machine objects having the same virtual IP address. Virtual machine object 230 corresponds to a second instance of virtual machine X.X.X.1 with Bind ID 2. Virtual machine 240 contains the general Bind ID 0. Virtual machine 240 handles connections coming from source IP addresses that are not bound to virtual machine objects that include Bind ID 1 or 2. Once different Bind ID's are created for each of the virtual machine objects, it is possible to create Bind ID objects that point to different virtual machine objects that have the same IP address and port number but different Bind ID's. Thus, different instances of a virtual machine object for a virtual IP address are defined and each different instance of the virtual machine object has a different Bind ID.

Figure 3A:
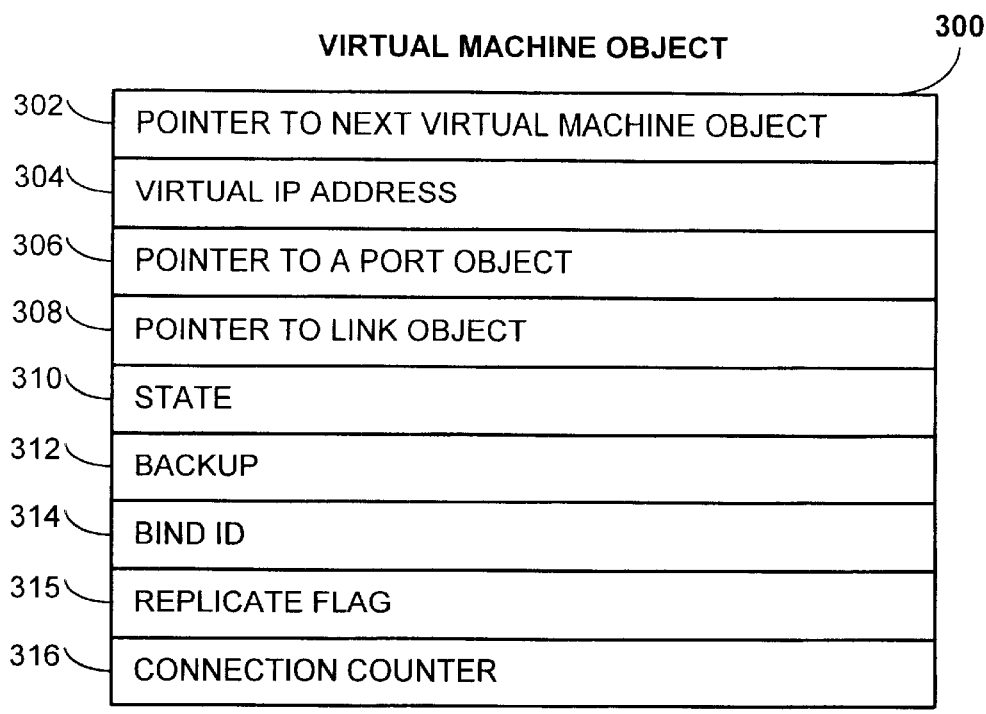
FIG. 3A is a block diagram illustrating the data structure of a virtual machine object.

FIG. 3A is a block diagram illustrating the data structure of a virtual machine object 300. Virtual machine object 300 includes a pointer 302 to the next virtual machine object to facilitate searching through the virtual machine objects. Virtual machine object 300 also includes a virtual machine IP address 304 which stores the IP address of one of the virtual machines that is being implemented by Local Director 300. A virtual port 306 specifies a virtual port on a virtual machine that the virtual machine object represents. A virtual machine object may represent all ports of a virtual machine or a specific port may be designated by the virtual machine object if the virtual machine object only represents a certain port. A pointer 308 to a link object facilitates searching for the physical machine object which has the best predicted response according to the chosen session distribution scheme. A state variable 310 stores the state of the virtual machine. A standby variable 312 stores a standby for the virtual machine. State variable 310 indicates whether the virtual machine is failed. A virtual machine is failed if all of the physical and virtual machines available to service it are failed.

A Bind ID field 314 stores a Bind ID for the virtual machine object. The Bind ID distinguishes different instances of a virtual machine object that include the same virtual IP address. A zero Bind ID indicates that the virtual machine object corresponds to a general virtual machine that is available for incoming SYN packets from foreign source IP addresses that have not been assigned to a particular virtual machine. A non-zero Bind ID indicates that the virtual machine object is assigned to or is available to be assigned to specific foreign source IP addresses that correspond to Clients that are handled in a special manner as described above.

A replicate flag 315 is used to indicate whether the virtual machine object is to be replicated on the failover connection manager. In one embodiment, a command is supplied that allows the system administrator to set the replicate flag independently for each virtual machine. Also, the virtual machine object includes a connection counter 316 used to count the number of connections to the virtual machine for the purpose of load balancing.

Figure 3B:
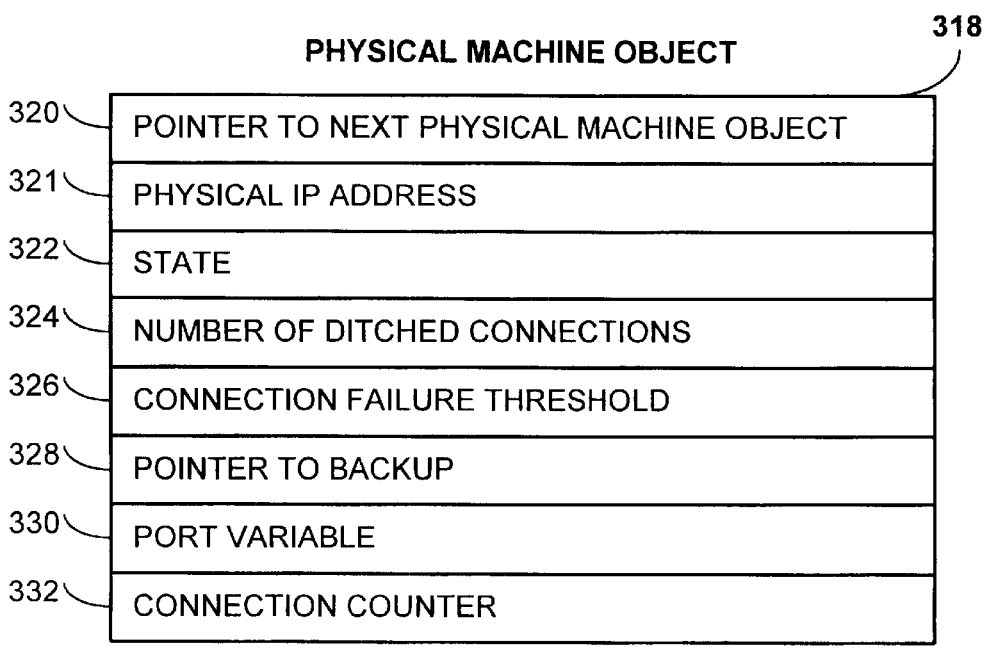
FIG. 3B is a block diagram illustrating the data structure of a physical machine object.

FIG. 3B is a block diagram illustrating the data structure of a physical machine object 318. Physical machine object 316 is used to store information related to a particular physical machine that is selected to serve connections to certain virtual machines. Physical machine object 316 contains a pointer 320 to the next physical machine object which facilitates searching among the physical machine objects. Physical machine object 316 also contains the real IP address 321 of the physical machine which it represents. A variable 322 stores the state (for example, in service or failed) of the physical machine and a variable 324 stores the number of ditched connections to the physical machine. Ditched connections are connections that are not successfully made after a number of resend of a SYN request. A variable 326 stores the connection failure threshold that determines the number of ditched connections required to fail the machine and a pointer 328 points to a standby machine. A port variable 330 stores a port number which indicates whether physical machine object 320 corresponds to an individual port on a machine. If port variable 330 is zero, then physical machine object 320 corresponds to all ports of a physical machine. Any other number is interpreted as a port number that the physical machine object represents. Also, the physical machine object includes a connection counter 332 used to count the number of connections to the virtual machine for the purpose of load balancing.

Figure 3C:
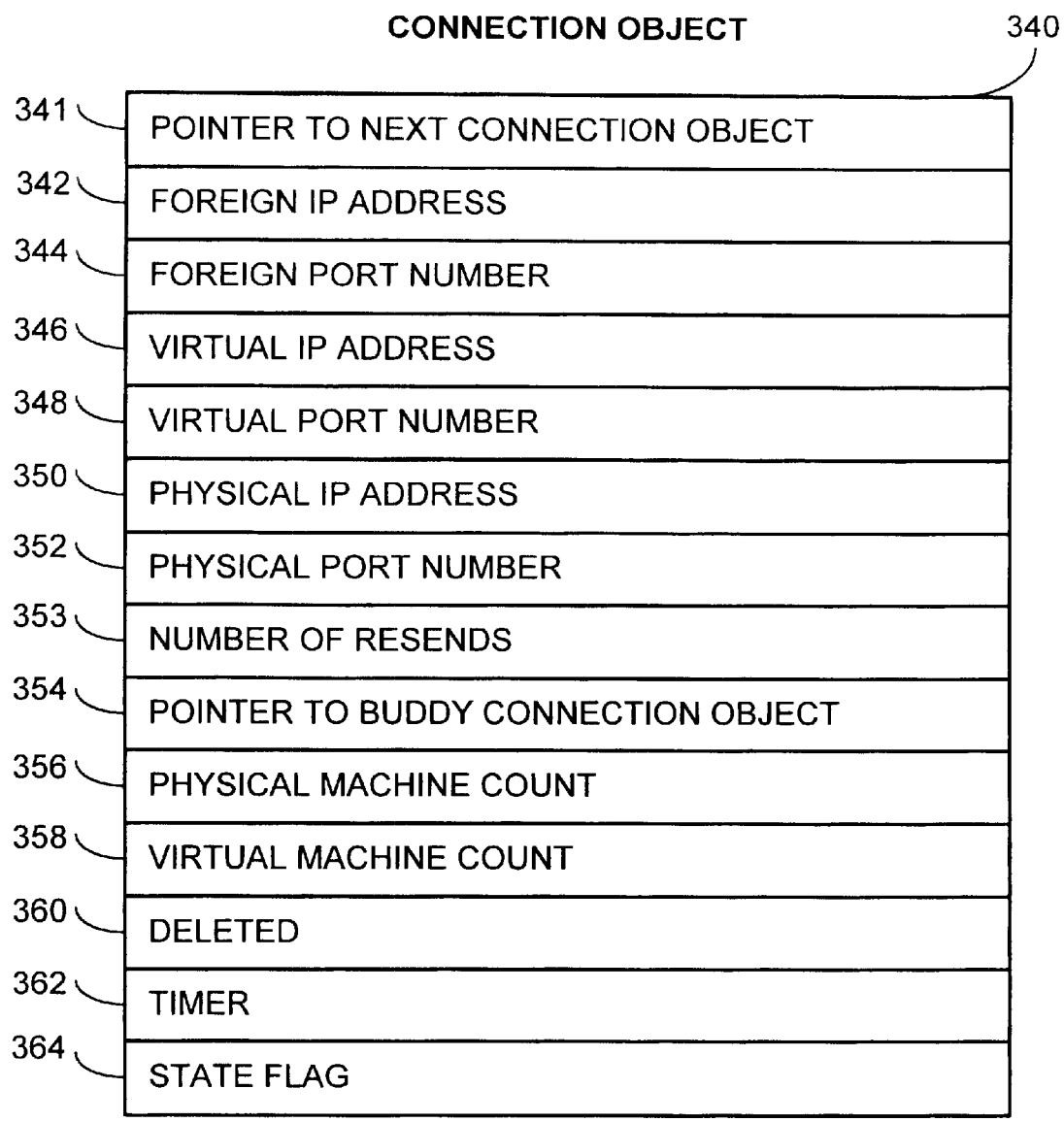
FIG. 3C is a block diagram illustrating a connection object data structure.

FIG. 3C is a block diagram illustrating a connection object data structure 340. Connection object 340 stores information related to individual connections made from a Client to one of the physical machines. Connection objects store the information necessary to ensure that packets transmitted from the Client to a virtual machine after a connection is established are routed to the physical machine for which the connection has been established. Connection object 340 includes a pointer 341 to the next connection object on its linked list hash chain. This pointer facilitates searching among the connection objects. In a preferred embodiment, the individual connection objects are stored in a hash chain to facilitate searching. Connection object 340 also includes the foreign IP address 342 and foreign port number 344 of the Client that is associated with the connection and the virtual machine IP address 346 and virtual machine port number 348 of the virtual machine that is being implemented for the connection. Connection object 321 also contains a physical IP address 350 of the physical machine to which the connection is assigned. A physical machine port number 352 is also included in the connection object. Variable 353 stores the number of times that a SYN packet has been resent to a physical machine to establish a connection.

A pointer 354 to a buddy connection object is also included so that associated connections can be linked for various purposes. For example, an FTP session may open up both a data and a control connection. Once a file is requested over the control connection, it may take a considerable amount of time to transfer the file over the data connection. In such a case, the control connection should not be timed out because there is no activity on the control connection since it is waiting for the data transfer to complete and has not been dropped by the other side. The activity on the data connection should prevent the control connection from being dropped. This is accomplished by designating the control and data connections as buddy connections and checking for activity on one before the other is timed out and deleted. As long as one of the buddy connections is still active, both connections are not deleted.

Connection object 340 also includes a physical machine count flag 356 and a virtual machine count flag 358. These flags are used to indicated that the connection has been counted for load balancing purposes by the physical machine object and the virtual machine object that correspond to the connection. A 0 indicates that the connection has not been counted and causes a process that updates the physical machine object and the virtual machine object counters to increment those counters when the connection object is checked. The flag states are then changed to 1. The connection object also includes a flag 360 that indicates when the connection object has been deleted. Other state flags 364 are also included in the connection object. The other state flags track the state of the connection, including whether the connection is active. The state flags also include details about the TCP state of the connection in certain embodiments.

A timer 362 is used to record a time at which activity occurred on the connection, such as the receiving of a packet. In one embodiment, connections are timed out periodically and deleted when the recorded time in timer 362 differs from the current time by more than a determined amount. As noted above, deletion of the connection object may be avoided if a buddy connection exists that has not been timed out.

Using the data structures shown in FIGS. 3A through 3C, Local Director 300 is able to provide the necessary IP addresses, port numbers, and pointers to establish a connection and define a connection object. The connection object contains all the information necessary to change the destination IP address and port number of incoming packets to the IP address and port number of a physical machine that is implementing a virtual machine. Likewise, the connection object contains all the information necessary to change the source IP address and port number of outgoing packets to the IP address and port number of a physical machine that is implementing a virtual machine. The connection object also keeps track of the number of resends of a SYN packet to establish a connection. Connections can be ditched after a certain number of resends and a new physical machine assigned to the connection. A physical machine object tracks the number of ditched connections for each physical machine and Local Director 300 uses this information to fail machines that ditch too many consecutive connections. Each physical machine object also contains a pointer to a standby physical machine so that if the physical machine fails, a backup can be made available.

Figure 4:
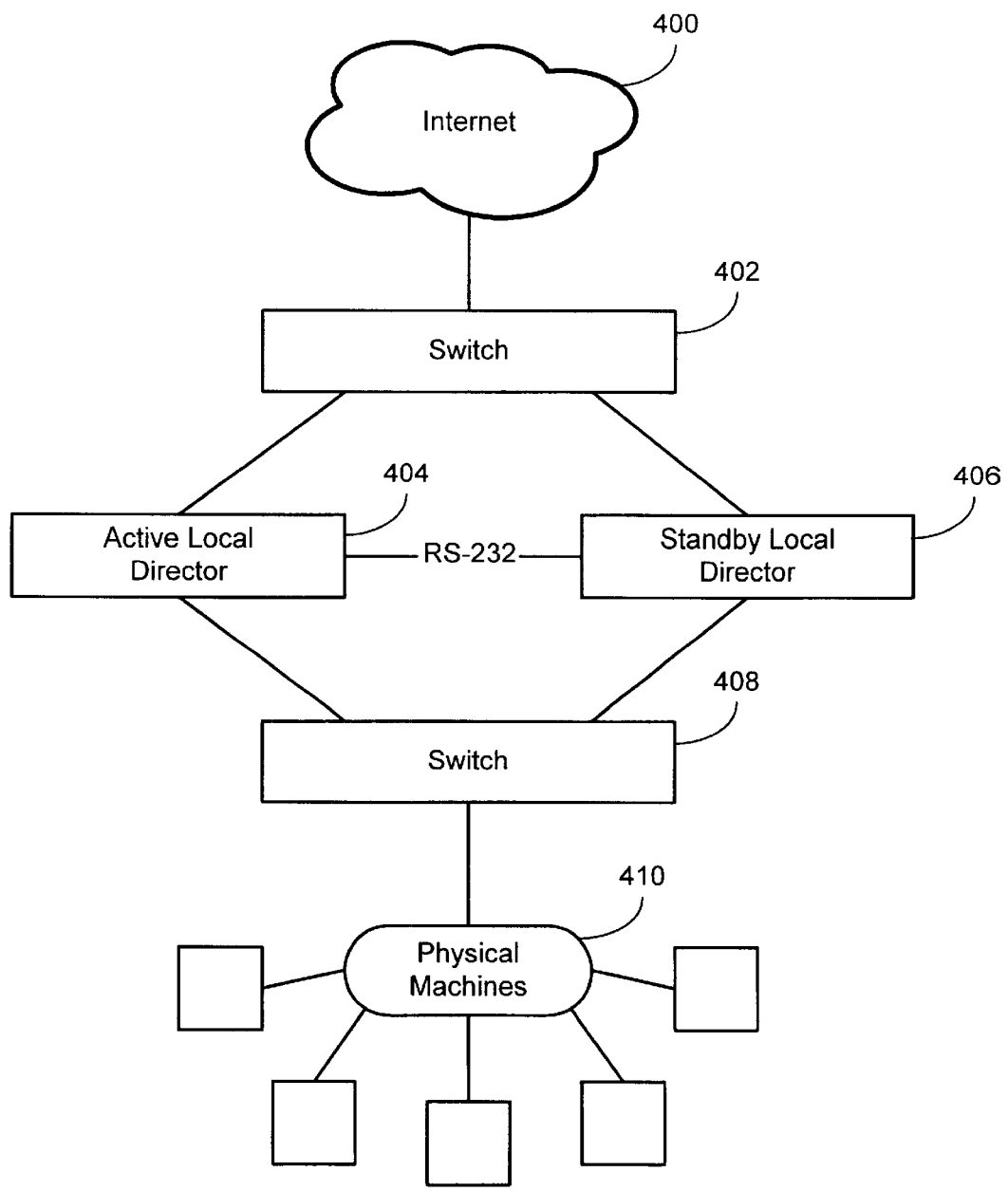
FIG. 4 is a block diagram illustrating a system that includes an active Local Director and a standby Local Director.

FIG. 4 is a block diagram illustrating a system that includes an active Local Director 404 and a standby Local Director 406. Active Local Director 404 is connected to the Internet 400 through a switch 402. Standby Local Director 406 is also connected via a parallel connection through switch 402 to the Internet. In addition, in certain embodiments, active Local Director 404 maintains an RS-232 connection to the standby Local Director 406. The RS-232 connection is used to transfer configuration information from the active Local Director to the standby Local Director. For example, if a new physical machine is added to the groups of physical machines available to the active Local Director, that information may be transferred to the standby Local Director via the RS-232 line. The bandwidth of the RS-232 line, however, is generally not sufficient to transfer all the information about the many connections being received and handled by the active Local Director. As will be described below, information about the individual connections is transferred to the standby Local Director via a UDP replication packet.

Active Local Director 404 and standby Local Director 406 are connected to a group of physical machines 410 via a switch 408. The physical machines are used by the active Local Director to handle connections to the virtual machines represented by the virtual IP addresses.

The standby Local Director monitors the state of all the connections being handled by the active Local Director. The active Local Director sends a replication packet to the standby Local Director whenever certain connection events occur. In one embodiment, a replication packet is sent whenever a connection becomes active. When a connection is considered to be in an active state may be defined in numerous ways. In one embodiment, the connection is in an active state when a SYN packet has been received and acknowledged with a SYN ACK packet and an ACK packet has been received from the party originating the connection. Thus, a replication packet is sent to the standby Local Director as soon as a connection is established. Likewise, when a connection is dropped or deleted, a replication packet is sent from the active Local Director to the standby Local Director indicating that event.

Figure 5:
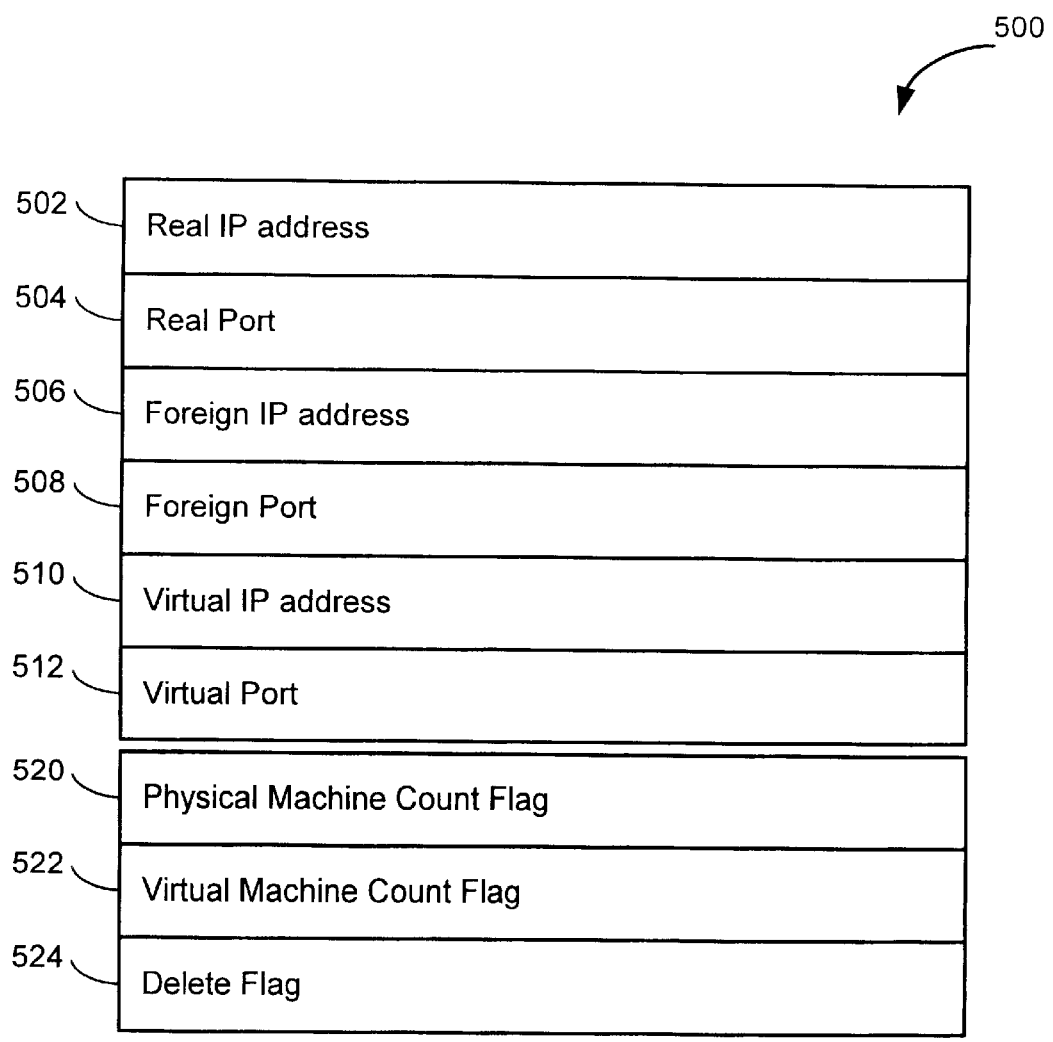
FIG. 5 is a block diagram illustrating the data structure of a replication packet that is sent from the active Local Director to the standby Local Director.

FIG. 5 is a block diagram illustrating the data structure of a replication packet that is sent from the active Local Director to the standby Local Director. Replication packet 500 includes a real IP address 502 and a real port number 504. Real IP address 502 and real port number 504 correspond to the IP address and port number of the physical machine that has been selected by the Local Director to handle the connection. Replication packet 500 also includes a foreign IP address 506 and a foreign port number 508. Foreign IP address and foreign port number 508 correspond to the outside client to which the connection is made. Replication packet 500 also includes a virtual IP address 510 and a virtual port number 512. Virtual IP address 510 and virtual port number 512 correspond to the virtual machine to which the client is sending packets. Thus, the replication packet includes all of the information necessary to handle the connection. The foreign and virtual IP addresses and port numbers identify packets that correspond to connections handled by the Local Director and the real IP address and port number are used to translate packet destination addresses. Other information from the connection object is included in the replication object as well. A physical machine count flag 520 and a virtual machine count flag 522 are included as well as a delete flag 524.

When the replication packet is sent as a result of a new connection being established, the physical machine count flag and the virtual machine count flag are set to 1, indicating that the connection has been counted. The delete flag is set to 0indicating that the connection has not been deleted. When the replication packet has been sent as a result of a connection being deleted, then the physical machine count flag and the virtual machine count flag are set to 0indicating that the connection is no longer counted as one of the connections to the physical machine and virtual machine. The delete flag is set to 1indicating that the connection has been deleted.

The state of the various flags is used by the standby Local Director to determine whether a new connection object should be created or whether an existing connection object should be found and deleted upon receipt of the replication packet. In general, the physical machine count flag should not be set when the delete flag is set and the physical machine count flag and the virtual machine count flag should both be set when the delete flag is not set. If this is not true, then the standby Local Director may note the error and not set up a new connection object. If no connection object is created by the standby Local Director when a connection object exists for a connection supported by the active Local Director, then that connection will be dropped and must be reestablished if the standby Local Director ever becomes active.

The replication packet is sent from the active Local Director to the standby Local Director using UDP. This allows a large volume of replication packets to be sent between the active Local Director and the standby Local Director without creating a large overhead burden on the active Local Director. Since UDP is not a reliable protocol, certain replication packets may be lost, but, as noted above, this does not cause a problem for all connections supported by the active Local Director upon failover. Only connections which did not have a connection object created on the backup Local director are dropped. Thus, the burden on the active Local Director is minimal. Replication packets are sent only when connections are established or torn down and the replication packets are sent via UDP to minimize overhead.

Figure 6A:
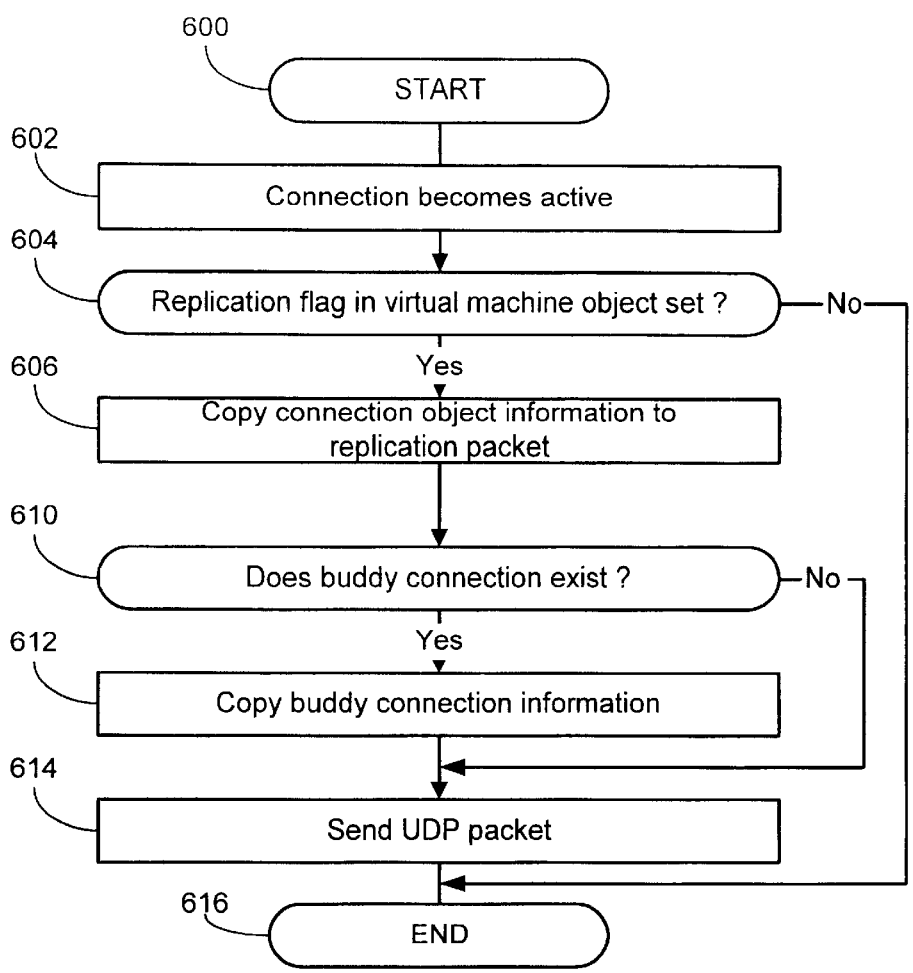
FIG. 6A is a flow chart illustrating a process for sending a replication packet.

FIG. 6A is a flow chart illustrating a process for sending a replication packet such as is described in FIG. 5. The process starts at 600. In a step 602, a connection become active. Next, it is determined whether the replication flag and the virtual machine object corresponding to the connection is set. If the flag is not set, then the process ends at 616. If the flag is set, then control is transferred to a step 606.

In step 606, the connection object information is copied to the replication packet. This includes the real IP address and port number, the foreign IP address and port number, and the various flags which are included in the replication packet. It should be noted that in certain embodiments, this information is stored directly in the connection object and so only the connection object needs to be accessed in order to copy the information. In other embodiments, the information such as the physical IP address may be stored in the physical machine object and the connection object may only include a pointer to the physical machine object. Whether information is obtained from the connection object directly or from data structures designated by the connection object, all of the information required to support the connection is written into the replication packet.

Next, in a step 610, the active Local Director determines whether a buddy connection exists for a connection. In one embodiment, this is determined by checking whether a buddy pointer exists in the connection object. If a buddy connection exists, control is transferred to a step 612 and the buddy connection information is copied into the replication packet as well. In different embodiments, the buddy connection information may be copied into a separate replication packet or the buddy connection information may be included along with the other connection information in the same replication packet. After the buddy connection information is copied in 612 or if no buddy connection is determined to exist in step 610, control is transferred to step 614 and the replication packet is sent via UDP. The process then ends at 616.

Figure 6B:
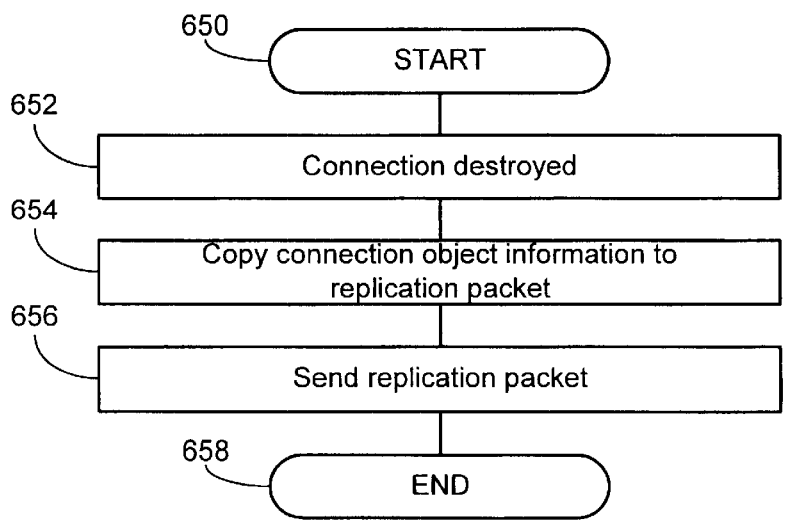
FIG. 6B is a flow chart illustrating a similar process that occurs when a connection is destroyed.

FIG. 6B is a flow chart illustrating a similar process that occurs when a connection is destroyed. The process starts at 650. In a step 652, the connection is destroyed. Next, in a step 654, the connection object information is copied to a replication packet for the connection that was just destroyed. The replication packet is sent in a step 656. The process ends at 658.

Figure 7:
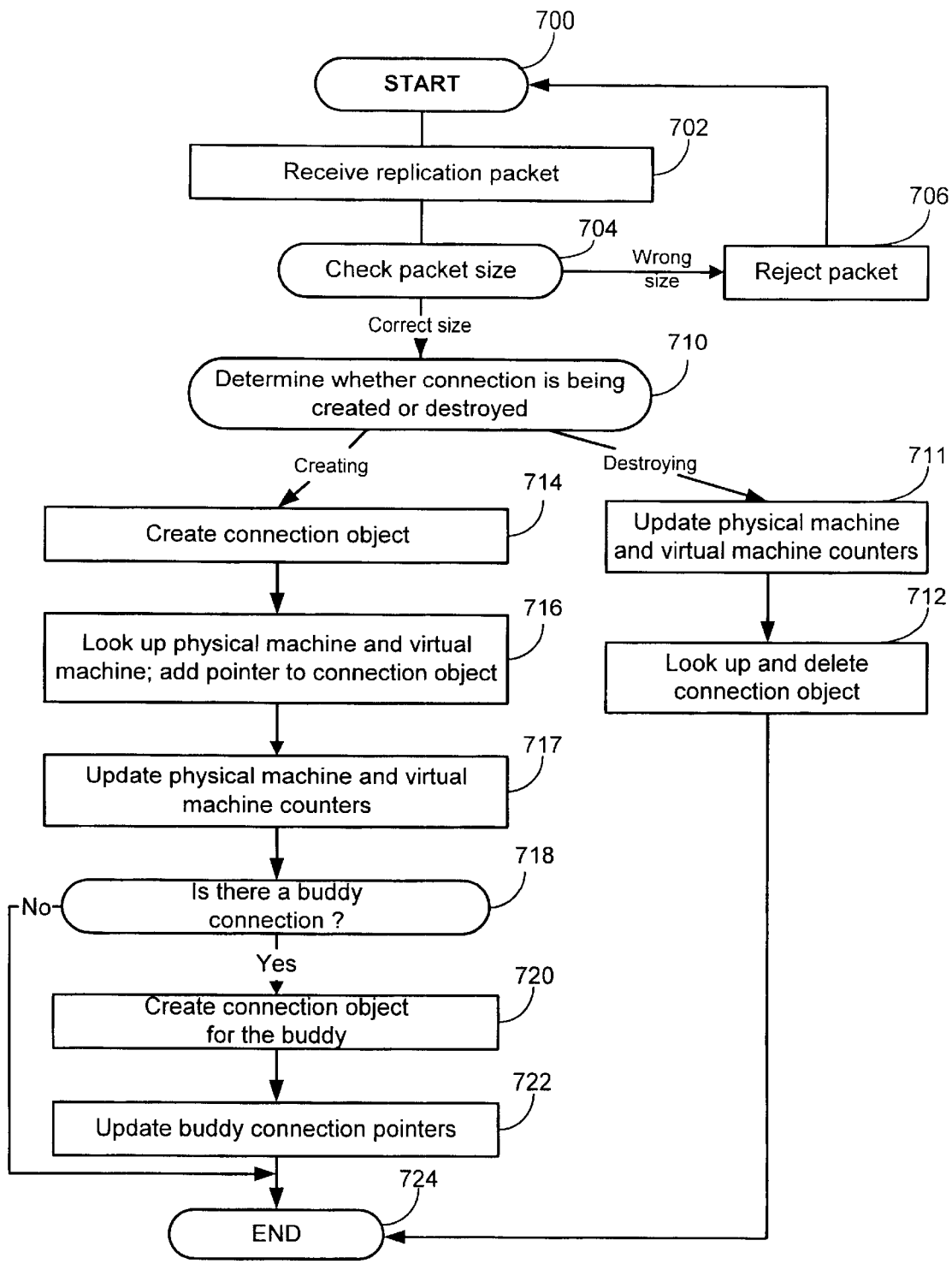
FIG. 7 is a flow chart illustrating the process of creating or deleting a connection object that is executed on a standby Local Director when a replication packet is received.

Once the replication packet is sent via UDP, the active Local Director does not need to do anything else in connection with ensuring that the backup Local director is prepared to handle the connection. Thus, the processing required by the active Local Director is minimal and replication packets are sent only upon the occurrence of certain specific events, i.e., the establishment or the tearing down of a connection. As shown in FIG. 7, the standby Local Director sets up its own data structures given the information contained in the replication packet without using the resources of the active Local Director.

FIG. 7 is a flow chart illustrating the process of creating or deleting a connection object that is executed on a standby Local Director when a replication packet is received. The process starts at 700. In a step 702, a replication packet is received. Next, in a step 704, the packet size of the UDP packet is checked. If the size is wrong, control is transferred to a step 706 and the packet is rejected. The process then ends at 724. If the packet size is correct, then control is transferred to a step 710 and it is determined whether a connection is being created or destroyed. This is determined by examining the flags which are sent as part of the replication packet. If the delete flag is set and the physical machine count flag and the virtual machine count flag are not set, then a connection is being destroyed. Control is then transferred to a step 711 where the physical machine and virtual machine counters are updated to reflect the fact that the connection exists for the virtual machine and is being handled by the physical machine. The virtual machine and physical machine counts are used for the purpose of load balancing once the standby Local Director becomes active. The process of updating those counts is described further in FIG. 8.

Next, in a step 712, the connection object that has a foreign IP address and foreign port and a real IP address and real port that correspond to the foreign IP address and foreign port and the real IP address and real port of the replication packet is deleted. As noted above, the connection object in some embodiments does not directly store the real IP address and real port, but instead stores a pointer to a physical machine object that contains the real IP address and real port number. In such embodiments, the connection object is not checked directly; instead, the real IP address and real port number of the physical machine object pointed to by the connection object are checked.

If it is determined in step 710 that a connection is being created, then control is transferred to a step 714 and a connection object is created. Next, in a step 716, the physical machine object corresponding to the real IP address and port number specified in the replication packet is looked up and a pointer to that physical machine is added to the connection object. In certain embodiments, the physical machine IP address and port number are stored directly in the connection object. Also, the other information from the replication packet is stored in the connection object. In a step 717, the physical machine and virtual machine counters are updated to reflect the fact that the connection exists for the virtual machine and is being handled by the physical machine. The virtual machine and physical machine counts are used for the purpose of load balancing once the standby Local Director becomes active. The process of updating those counts is described further in FIG. 8.

In a step 718, it is determined whether the replication packet also includes a buddy connection. If no buddy connection is included, then the process ends at 724. If a buddy connection is included, then a connection object is created for the buddy connection in a step 720. It should be noted that there may be more than one buddy connection designated for the connection. If that is the case, then additional replication packets will be generated for each buddy connection. Next, in a step 722, the buddy connection pointers are updated in each of the connection objects created to point to the other buddy connection. The process then ends at 724.

Figure 8:
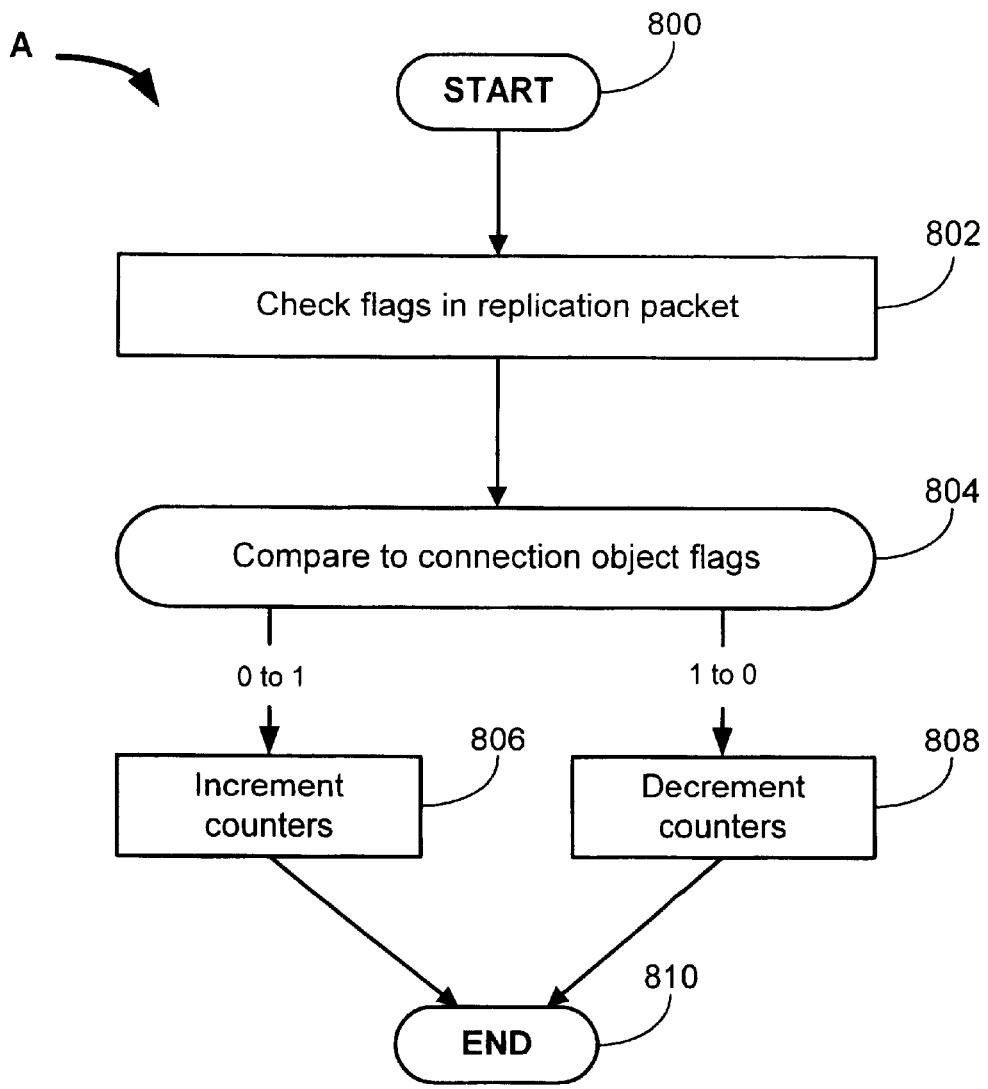
FIG. 8 is a block diagram illustrating a process for updating the physical machine object and virtual machine object counts.

FIG. 8 is a block diagram illustrating a process for updating the physical machine object and virtual machine object counts in step 708. The process starts at 800. In a step 802, the physical machine count flag and the virtual machine count flag in the replication packet are checked. In a step 804, the flags in the replication packet are compared to the connection object flags in the standby Local Director. If the physical machine object count and the virtual machine object count are 1 in the replication packet and 0 in the standby Local Director, then the counts for the physical machine object and virtual machine object are each incremented in a step 806. If the physical machine object count flag and the virtual machine object count flag are 0 in the replication packet and are 1 in the connection object stored in the standby Local Director, then the physical machine object count and the virtual machine object count are decremented in a step 808. Whether the object counts are incremented or decremented, the process ends at 810.

Thus, it has been shown that when the backup Local director receives a replication packet from the active Local Director, the backup Local director creates a connection object that corresponds to the connection object on the active Local Director that provides all of the information necessary to handle packets sent to virtual machines implemented on the active Local Director. Also, the standby Local Director is configured to support the same virtual machines as the active Local Director. The configuration of the active Local Director may be mirrored on the standby Local Director a number of ways. In the embodiment described above, an RS-232 connection between the active Local Director and standby Local Director is used for that purpose. The standby Local Director keeps updated the counters in virtual machine objects and physical machine objects so that the standby Local Director is ready to begin load balancing new connections received after it becomes active. The standby Local Director is able to handle existing connections because it maintains a connection object that corresponds to the connection object on the active Local Director that is handling each connection. Thus, the standby Local Director is able to begin immediately to handle existing connections and to load balance new connections just as the active Local Director would have handled the connections if it had not failed.

Figure 9:
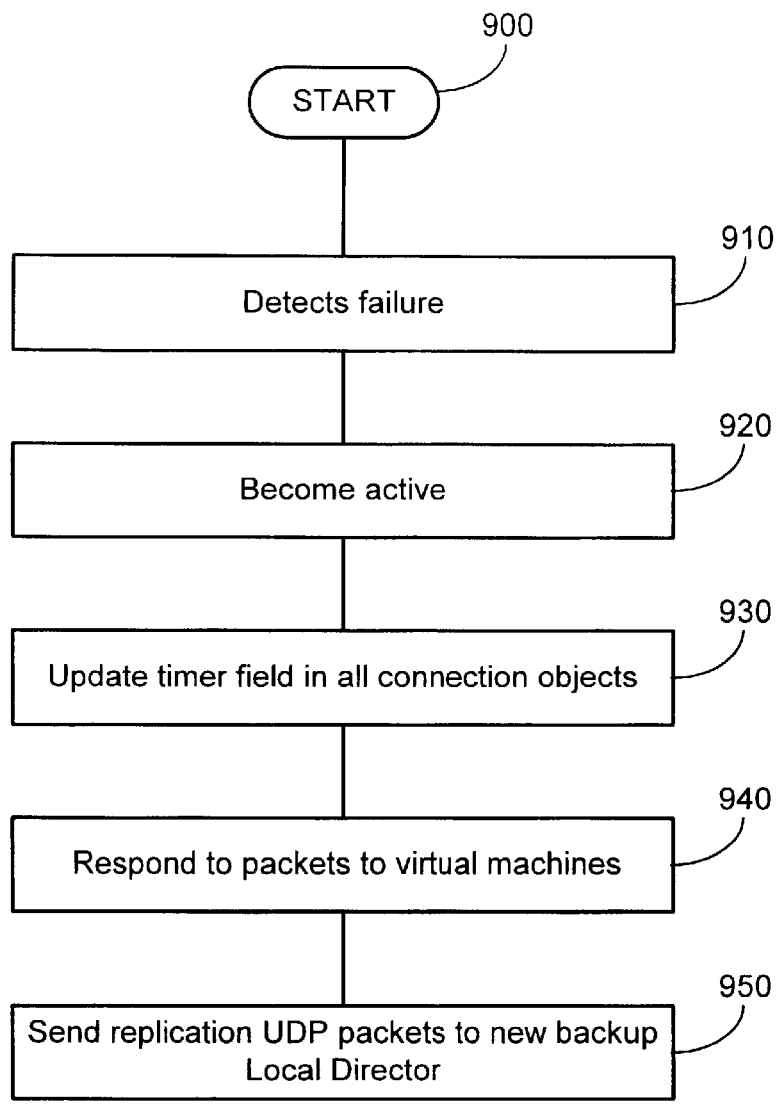
FIG. 9 is a flow chart illustrating a process run on the standby Local Director when it detects a failure of the active Local Director and must become active.

FIG. 9 is a flow chart illustrating a process run on the standby Local Director when it detects a failure of the active Local Director and must become active. The process starts at 900. In a step 910, a failure of the active Local Director is detected. Next in a step 920, the standby Local Director becomes active. In a step 930, the timer field is updated in all of the connection objects on the newly active Local Director. The timer field is used to time out a connection object when no activity occurs on the connection for a specified period of time. While the standby Local Director is inactive, it does not handle packets for connections and so none of the connection object timers in the standby Local Director are updated when connection activity occurs. Thus, many of the connection objects on the standby Local Director would be timed out. By updating the timer field to the current time when the standby Local Director becomes active, the connection objects are all preserved and are not timed out until a time out period expires beginning from the time that the standby Local Director becomes active.

Thus, the active Local Director need not send packets to the standby Local Director indicating connection activity in order to prevent the standby Local Director from timing out connection objects. The standby Local Director does not time out connection objects and only deletes connection objects when a replication packet is received from the active Local Director indicating that a connection object has been deleted. In some embodiments, a very long time out period may be specified to get rid of connection objects that were not deleted as a result of some error. This system minimizes the requirement on the active Local Director to send information to the standby Local Director.

In a step 940, the newly active standby Local Director begins responding to packets from clients directed to virtual machines that the Local Director supports. Since the standby Local Director maintains all of the connection objects required to support the connections, no other special process is required to activate the standby Local Director. The standby Local Director also keeps track of the physical machine object and virtual machine object counts as described above so that the Local Director is also ready to start load balancing upon becoming active. In a step 950, the standby Local Director begins sending replication UDP packets to a new standby Local Director. The new standby Local Director may be the formerly active Local Director that failed or it may be an additional available standby Local Director. The newly active standby Local Director continues to handle packets for connections until it is reconfigured out of service or to become a standby Local Director again.

Thus, a method has been described for sending replication packets to a standby Local Director that enables the standby Local Director to maintain connection objects for connections being supported by an active Local Director. When the active Local Director fails, the standby Local Director is immediately able to begin handling packets for connections formerly supported by the failed Local Director and to load balance new connections.

Figure 10:
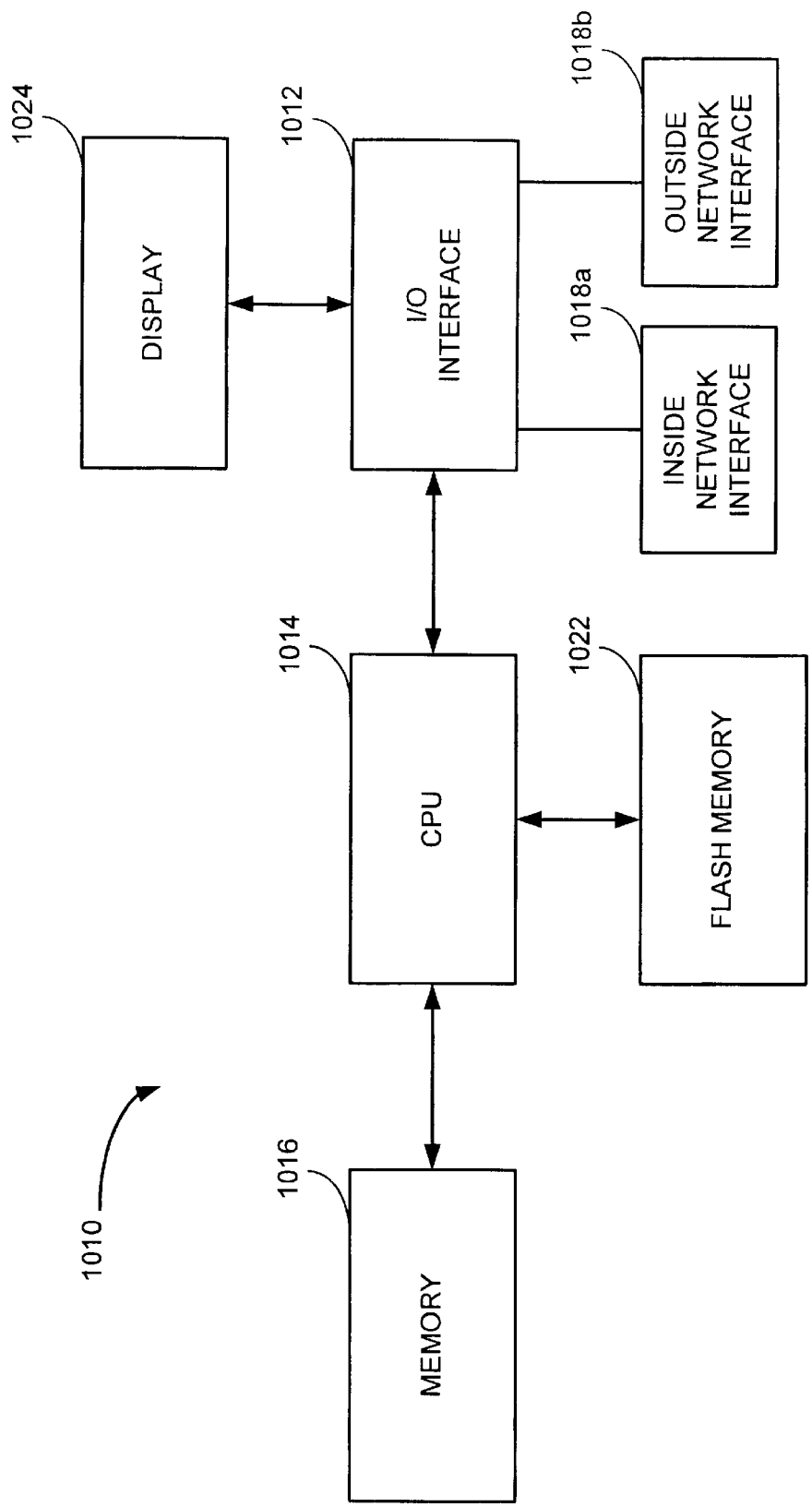
FIG. 10 illustrates a typical computer-based system which may be used as a Local Director of the present invention.

FIG. 10 illustrates a typical computer-based system which may be used as a Local Director of the present invention. Shown is a computer 1010 which comprises an input/output interface 1012 used to communicate information in appropriately structured form to and from the parts of computer 1010 and associated equipment, a central processing unit 1014, and a memory 1016. These components are those typically found in most general and special purpose computers 1010 and are intended to be representative of this broad category of data processors.

Connected to the input/output circuit 1012 are inside and outside high speed Local Area Network interfaces 1018*a* and 1018*b*. The inside interface 1018*a* is connected to a private network, while the outside interface 1018*b* is be connected to an external network such as the Internet. Preferably, each of these interfaces includes (1) a plurality of ports appropriate for communication with the appropriate media, (2) associated logic, and in some instances (3) memory. The associated logic may control such communications intensive tasks as packet integrity checking and media control and management. The high speed interfaces 1018*a* and 1018*b* are preferably multiport Ethernet interfaces, but may be other appropriate interfaces such as FDDI interfaces, etc.

The computer system may also include an input device (not shown) such as a keyboard. A flash memory device 1022 is coupled to the input/output circuit 1012 and provides additional storage capability for the computer 1010. The flash memory device 1022 may be used to store programs, data and the like and may be replaced with a magnetic storage medium or some other well known device. It will be appreciated that the information retained within the flash memory device 1022, may, in appropriate cases, be incorporated in standard fashion into computer 1010 as part of the memory 1016.

In addition, a display monitor 1024 is illustrated which is used to display output messages or images generated by the present invention. Such a display monitor 24 may take the form of any of several well-known varieties of cathode ray tube displays and flat panel displays or some other type of display.

Although the system shown in FIG. 10 is a preferred computer system of the present invention, the displayed computer architecture is by no means the only architecture on which the present invention can be implemented. For example, other types of interfaces and media could also be used with the computer.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. For example, whenever a variable is described as being stored in an object, the variable could equivalently be stored in a different data structure and a pointer to the data structure could be provided in the object. Accordingly, the present embodiments are to be considered as illustrative and not restrictive, and the invention is not to be limited to the details given herein, but may be modified within the scope and equivalents of the appended claims.

What is claimed is:

1. A fault tolerant connection manager system comprising:

an active connection manager that implements a virtual machine on a physical machine by translating destination IP addresses of incoming packets that have a packet source address that matches a designated foreign IP address and a packet destination address that matches a designated virtual IP address into a designated physical IP address;

a standby configuration connection that transfers configuration information about the virtual machine and the physical machine from the active connection manager to a standby connection manager; and the standby connection manager configured to implement the virtual machine on the physical machine, the standby connection manager including a standby connection object that includes the designated foreign IP address, the designated virtual IP address and the designated physical IP address from the replication packet on the standby connection manager.

2. A fault tolerant connection manager system as recited in claim 1, a fault tolerant connection manager system including: wherein the active connection manager is configured to send the standby connection manager a replication packet and the replication packet includes the designated foreign IP address, the designated virtual IP address and the designated physical IP address.

3. A fault tolerant connection manager system comprising:

means for an active connection manager that implements a virtual machine on a physical machine by translating destination IP addresses of incoming packets that have a packet source address that matches a designated foreign IP address and a packet destination address that matches a designated virtual IP address into a designated physical IP address;

means for a standby configuration connection that transfers configuration information about the virtual machine and the physical machine from the active connection manager to the standby connection manager; and means for a standby connection manager configured to implement the virtual machine on the physical machine, the standby connection manager including a standby connection object that includes the designated foreign IP address, the designated virtual IP address and the designated physical IP address from the replication packet on the standby connection manager.

4. A method for fault tolerant connection manager comprising:

implementing a virtual machine on a physical machine by translating destination IP addresses of incoming packets that have a packet source address that matches a designated foreign IP address and a packet destination address that matches a designated virtual IP address into a designated physical IP address, wherein the implementation is performed by an active connection manager;

transferring configuration information about the virtual machine and the physical machine from the active connection manager to a standby connection manager, wherein the transfer is performed by a standby configuration connection;

implementing the virtual machine on the physical machine by the standby connection manager, the standby connection manager including a standby connection object that includes the designated foreign IP address, the designated virtual IP address and the designated physical IP address from the replication packet on the standby connection manager.

5. A computer program product for a fault tolerant connection manager comprising:

computer code implementing a virtual machine on a physical machine by translating destination IP addresses of incoming packets that have a packet source address that matches a designated foreign IP address and a packet destination address that matches a designated virtual IP address into a designated physical IP address, wherein the implementation is performed by an active connection manager;

computer code transferring configuration information about the virtual machine and the physical machine from the active connection manager to a standby connection manager, wherein the transfer is performed by a standby configuration connection;

computer code implementing the virtual machine on the physical machine by the standby connection manager, the standby connection manager including a standby connection object that includes the designated foreign IP address, the designated virtual IP address and the designated physical IP address from the replication packet on the standby connection manager; and a computer readable medium that stores the computer codes.

6. The computer program product of claim 5, wherein the computer readable medium is selected from the group consisting of CD-ROM, floppy disk, tape, flash memory, system memory, hard drive, and data signal embodied in a carrier wave.

* * * * *

UNITED STATES PATENT AND TRADEMARK OFFICE
CERTIFICATE OF CORRECTION

PATENT NO. : 6,366,558 B1
DATED : April 2, 2002
INVENTOR(S) : Richard A. Howes et al.

It is certified that error appears in the above-identified patent and that said Letters Patent is hereby corrected as shown below:

Title page,
Item [63], Related U.S. Application Data, delete "abandoned" and insert -- U.S. Patent No. 6,317,775 --. therefor, after "now" delete "abandoned" and insert -- U.S, Patent No. 6,104,717 --.

Signed and Sealed this

Twenty-fifth Day of January, 2005

JON W. DUDAS
*Director of the United States Patent and Trademark Office*